United States Patent [19]

Heckert

[11] Patent Number: 4,722,847
[45] Date of Patent: Feb. 2, 1988

[54] FRUIT JUICE BEVERAGES AND JUICE CONCENTRATES NUTRITIONALLY SUPPLEMENTED WITH CALCIUM

[75] Inventor: David C. Heckert, Oxford, Ohio

[73] Assignee: The Procter & Gamble Company, Cincinnati, Ohio

[21] Appl. No.: 860,607

[22] Filed: May 7, 1986

[51] Int. Cl.⁴ ............................................... A23L 2/02
[52] U.S. Cl. ...................................... 426/74; 426/599
[58] Field of Search ................. 426/590, 591, 650, 74, 426/477, 599, 453, 454, 455

[56] References Cited

U.S. PATENT DOCUMENTS

| | | |
|---|---|---|
| 2,325,360 | 7/1943 | Ayers et al. . |
| 3,114,641 | 12/1963 | Sperti ................................. 426/599 |
| 3,657,424 | 4/1972 | Atkins et al. . |
| 3,723,133 | 3/1973 | Berry et al. . |
| 4,078,092 | 3/1978 | Nishiyama . |
| 4,551,342 | 11/1985 | Nakel et al. . |

FOREIGN PATENT DOCUMENTS 75114 3/1983 European Pat. Off. .
54-8767 1/1979 Japan .
2095530 10/1982 United Kingdom .

*Primary Examiner*—Raymond N. Jones
*Assistant Examiner*—Carolyn Paden
*Attorney, Agent, or Firm*—Eric W. Guttag; Ronald L. Hemingway; Richard C. Witte

[57] ABSTRACT

Fruit juice beverages and juice concentrates nutritionally supplemented with significant levels of solubilized calcium are disclosed. These beverages and concentrates are substantially free of added protein, and comprise at least about 45% fruit juice. The method for preparing these beverages and concentrates involves forming a premix solution containing highly soluble calcium citrate and malate species which is then combined with concentrated fruit juice, plus other fruit juice materials. This method provides beverages and concentrates which contain substantial levels of solubilized calcium without generating cooked/browned off-flavors and without including undesirable species such as chloride ions.

18 Claims, 1 Drawing Figure

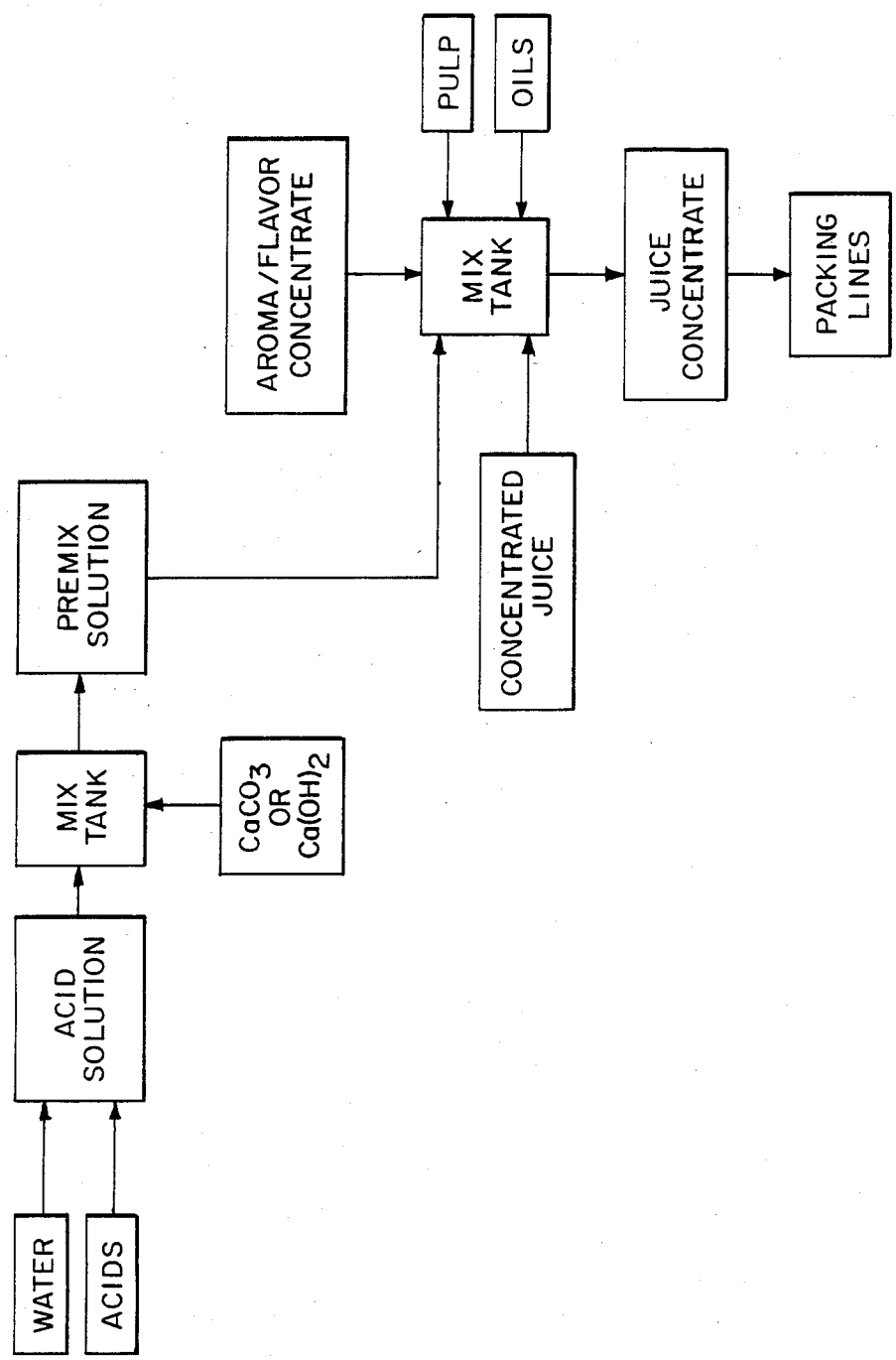

FRUIT JUICE BEVERAGES AND JUICE CONCENTRATES NUTRITIONALLY SUPPLEMENTED WITH CALCIUM

TECHNICAL FIELD

This application relates to fruit jucie beverages and juice concentrates which are nutritionally supplemented with significant levels of calcium. This application further relates to a method for preparing these beverages and concentrates.

Dietary calcium inadequacy may be a contributing cause to osteoporosis, at least for some populations. For example, a positive correlation between calcium intake and bone mass has been found across many age groups. It has also been suggested that the level of calcium intake early in life directly influences the peak bone mass achieved at skeletal maturity.

During the period of late teenage to young adulthood, it has been found that a significant reduction in dietary calcium intake typically occurs. This is especially true of the female population where reduced dietary calcium intake usually happens much earlier in life compared to their male counterparts. Accordingly, females, as a class, are especially susceptible to a prolonged calcium deficit over their life span. This calcium deficit may be one reason for the greater incidence of osteoporosis in postmenopausal women.

Calcium can be obtained from a variety of dietary sources. The primary sources of calcium are dairy products, in particular milk. Milk provides a very valuable source of dietary calcium. However, beginning in late teenage to young adulthood and continuing through later life, milk is typically not consumed in sufficient quantities by the general population to obtain needed levels of calcium. This may be caused by the unattractiveness of milk as a drink for "social occasions". Indeed, it has been found that teenage girls, and especially young adult women, generally find milk to be a socially unattractive drink, as well as too caloric and unappealing in taste. Additionally, a significant portion of the population becomes lactose intolerant as they reach maturity, resulting in gastrointestinal problems if they consume milk.

To achieve greater consumption of calcium, a more appealing alternative to milk is apparently needed. This alternative must be one which is consumed in sufficient quantities to provide nutritionally beneficial amounts of calcium. Beverages which are consumed often by the general public at breakfast are fruit juice products, especially orange juice. Like milk, orange juice has a wholesome, nutritional image. Also, orange juice is generally considered to have an appealing taste. Accordingly, orange juice nutritionally supplemented with calcium could be viewed as an additional vehicle for achieving greater dietary calcium intake through-out life.

Nutritional supplementation of orange juice, or other fruit juices, with significant levels of calcium is not straight forward. Milk contains, on average, about 0.12% calcium by weight. Inclusion of such a high level of calcium in orange juice requires consideration of a number of issues.

One is making sure that the calcium-supplemented orange juice has desirable taste qualities. It has been found that direct addition of calcium sources, such as calcium carbonate or calcium hydroxide, to orange juice can generate undesirable cooked/browned off-flavors or cause desirable aroma and flavor compounds to be stripped from the juice. Addition of calcium salts such as calcium chloride at high levels (e.g. above 0.11% calcium chloride) can impart undesirable brackishness to the juice. Calcium chloride addition has also been found to reduce the flavor intensity and quality, as well as the sweetness of orange juice. Accordingly, the calcium source needs to be added in a way which does not significantly affect the desirable taste and sweetness properties of orange juice.

Another potential issue is insuring that the calcium is solubilized in the juice. Solubilization of calcium in juice concentrates can be a very significant problem because of the high level of calcium present. However, solubilization of calcium in single-strength juice products can also be difficult due to the acid systems and other components present in the juice. Orange juice naturally contains a mixture of citric acid and malic acid. The most thermodynamically stable calcium citrate species which form when a calcium source is directly added to orange juice are also the most insoluble. These insoluble calcium citrate species can precipitate out of the orange juice fairly rapidly. Accordingly, the calcium source also needs to be added in a way which insures solubilization of the calcium in both single-strength orange juice beverages and juice concentrates.

Another factor which must be considered is the absorbability and bioavailability of the calcium from the juice. As used herein, "absorbability" refers to the amount of calcium which ends up in the blood serum. As used herein, "bioavailability" refers to the ability of the calcium to reach the site of bioactivity, i.e., bone. Milk is likely to be the standard against which absorbility and bioavailability of calcium from a non-milk beverage will be measured. Accordingly, to the extent possible, calcium-supplemented orange juice should approach, or desirably exceed, milk in terms of absorbability and bioavailability of calcium.

BACKGROUND ART

U.S. Pat. No. 2,325,360 to Ayres et al., issued July 27, 1943, discloses a method for replacing gases removed during deseration of fruit juices, such as orange juice, with carbon dioxide. In this method, dry calcium carbonate, or a mixture of calcium carbonate and citric acid, is dropped into a can which is then filled with deserated orange juice. (Other organic acids such as malic and tartaric acid can be used in place of citric acid.) The reaction between the calcium carbonate and added citric acid, or citric acid in the juice, generates the carbon dioxide.

U.S. Pat. No. 3,657,424 to Akins et al, issued Apr. 18, 1972, discloses the fortification of citrus juices, including orange juice, with sodium, calcium and chloride ions in amounts beyond what is naturally present in the juice. Calcium salts which can be used in fortification include the chlorides, citrates or phosphates, although calcium chloride is preferred for providing the desired chloride ion. The maximum amounts of calcium salts permitted in these fortified citrus juices is up to about 0.04%. (This calculates to about 0.015% calcium in the juice if calcium chloride is used.) The citrus juices fortified can be single-strength, diluted or frozen concentrates.

U.S. Pat. No. 3,114,641 to Sperti et al., issued Dec. 17, 1963, discloses extended orange juice products obtained by diluting single-strength orange juice or concentrated orange juice. To maintain the flavor of the diluted orange juice product, materials such as calcium chloride, magnesium chloride, sodium or potassium citrates, tartaric and malic acids (or their salts) are included in "very small amounts." These extended orange juice products are based on a dilution factor of 1:1 to 1:4 when single-strength juices are used or 1:12 to 1:16 when concentrated juices are used. The one example given of an additive formula for use with these extended products contains calcium chloride (0.04%), citric acid (0.85%) and sodium citrate (0.06%). This additive formula can be added directly to the single-strength juice or concentrate, the water used to make the extended product, or to the extended product itself.

British Pat. Specification No. 2,095,530, published Oct. 6, 1982, discloses a process for obtaining an acid beverage enriched in protein, particularly a fruit juice or fruit-flavored beverage. In this process, an aqueous suspension of soy protein is prepared using water and/or fruit juice. Calcium in a concentration of from 5 to 50 mM is added, after which the pH of the suspension is reduced and the insoluble material separated to yield a protein solution. A fruit juice or fruit flavoring can then be added to this protein solution. The calcium can be added in the form of the chloride, acetate, tartrate, malate or lactate salt, although calcium chloride appears to be preferred. The beverage described in Example II, which uses orange juice as the extraction medium, has 30 mM of calcium added.

European Pat. Application No. 75,114, published Mar. 30, 1983, discloses protein-containing fruit juice drinks enriched with vitamins and minerals. These drinks contain 30-90% fruit juice (a mixture of 20-70% apple juice, 4-40% white grape juice, 1-10% passion fruit juice and 5-25% lemon juice), 2 to 20% whey protein concentrate, and a mineral salt mixture of potassium, sodium, magnesium, calcium and phosphate. Calcium is present in these drinks at 0.01 to 0.3%, preferably at 0.02 to 0.03%. These drinks can be prepared by combining a first solution of apple, passion fruit and grape juice containing the whey concentrate with a second aqueous solution of lemon juice containing the mineral salt mixture. The calcium salts used in this mineral salt mixture are not specified.

DISCLOSURE OF THE INVENTION

The present invention relates to single-strength fruit juice beverages, in particular orange juice beverages, which are nutritionally supplemented with significant levels of calcium. These beverages are substantially free of added protein and comprise:

(a) from about 0.05 to about 0.26% by weight solubilized calcium;
(b) from about 0.4 to about 4% by weight of an acid component comprising a mixture of citric acid and malic acid in a weight ratio of from about 5:95 to about 90:10;
(c) at least about 45% fruit juice;
(d) a sugar content of from about 2° to about 16° Brix; and
(e) no more than about 0.07% by weight chlorideion.

The present invention also relates to calcium-supplemented fruit juice concentrates, in particular orange juice concentrates. These juice concentrates comprise:

(a) from about 0.15 to about 1.30% by weight solubilized calcium;
(b) from about 1.2 to about 20% by weight of an acid component comprising a mixture of citric acid and malic acid in a weight ratio of from about 5:95 to about 90:10;
(c) at least about 45% fruit juice; and
(d) a sugar content of from about 6° to about 75° Brix.

The present invention further relates to a method for preparing these calcium-supplemented juice products. In this method, an at least meta-stable aqueous premix solution of solubilized calcium is formed from water, an acid component comprising from 0 to about 90% by weight citric acid and from about 10 to 100% by weight malic acid, and a calcium source selected from calcium carbonate, calcium oxide, and calcium hydroxide. This premix solution of solubilized calcium is then combined with fruit juice materials which comrprise concentrated fruit juice having a sugar content of from about 20° to about 80° Brix, to provide a calcium-supplemented juice product having: (1) at least about 0.05% solubilized calcium: (2) at least about 45% fruit juice; and (3) a sugar content of from about 2° to about 75° Brix.

The method of the present invention solves several significant problems which can be caused by direct addition of calcium sources to fruit juices or fruit juice concentrates. One is insuring solubilization of substantial levels of calcium in the juice or juice concentrate. Another is avoiding generation of cooked/ brown off-flavors or the inclusion of undesirable species such as chloride ions. This method also permits the removal of carbon dioxide generated by the reaction of calcium carbonate with the acids so that undesirable carbonation of the juice does not occur. In addition, it has been surprisingly found that the absorbability/bioavailability of calcium from the fruit juice products of the present invention is at least as good as that of calcium from milk.

A. Brief Description of the Drawing

The FIGURE represents a schematic diagram of a preferred method for preparing calcium-supplemented fruit juice products according to the present invention.

B. Definitions

As used herein, the term "fruit juice product" refers to both fruit juice beverages and fruit juice concentrates which comprise at least about 45% fruit juice.

As used herein, the term "fruit juice beverage" refers to a fruit juice product which is in a single-strength, ready-to-serve, drinkable form. Fruit juice beverages of the present invention can be of the "full-strength" type which typically comprise at least about 95% fruit juice.

Fruit juice beverages within the scope of the present invention also include extended juice products which are referred to as "nectars". These extended juice products typically comprise from about 50 to about 90% fruit juice. Preferred extended juice products comprise from about 50 to about 70% fruit juice.

As used herein, the term "fruit juice concentrate" refers to a fruit juice product which, when diluted with the appropriate amount of water, forms drinkable fruit juice beverages. Fruit juice concentrates within the scope of the present invention are typically formulated to provide drinkable beverages when diluted with 3 to 5 parts by weight water.

As used herein, the term "concentrated fruit juice" refers to fruit juice from which a portion of the water has been removed.

As used herein, the term "fruit juice materials" refers to concentrated fruit juice, plus other fruit juice materials such as fruit juice aroma and flavor volatiles, poel oils, and pulp or pomace.

As used herein, the term "fruit juice" refers to citrus juices, noncitrus juices such as apple juice, grape juice, pear juice, cherry juice, berry juice, pineapple juice, peach juice, apricot juice, plum juice, prune juice, and mixtures of these juices.

As used herein, the term "citrus juice" refers to fruit juices selected from orange juice, lemon juice, lime juice, grapefruit juice, tangerine juice and mixtures thereof.

As used herein, the term "comprising" means various components can be conjointly empolyed in the fruit juice beverages and juice concentrates of the present invention. Accordingly, the term "comprising" encompasses the more restrictive terms "consisting essentially of" and "consisting of".

All amounts of fruit juice referred to herein are on a single-strength basis.

C. Calcium Supplemented Fruit Juice Beverages and Juice Concentrates

The key nutritional component added to the fruit juice beverages and juice concentrates of the present invention is calcium. Suitable sources of calcium include calcium carbonate, calcium oxide, and calcium hydroxide. To be useful in the present invention, the calcium hydroxide. To be useful in the present invention, the calcium needs to be "solubilized", i.e., dissolved, in the fruit juice beverage or juice concentrate. Accordingly, the amount of calcium included in the beverages and concentrates of the present invention will be referred to in terms of "solubilized calcium", i.e., the amount of calcium ion dissolved in the beverage or concentrate.

For fruit juice beverages of the present invention, calcium is present in an amount of at least about 0.05% by weight. This minimum level of calcium (about half of milk level) provides significant nutritional supplementation for the beverage. The maximum level of calcium is up to about 0.26% by weight. As the level of calcium in the beverage is increased much beyond about 0.26% by weight, satisfactory taste and stability properties become much more difficult to achieve. Preferably, the level of calcium in such beverages is from about 0.10 to about 0.15% by weight which includes milk level, i.e., 0.12% by weight.

With regard to fruit juice concentrates of the present invention used to prepare drinkable beverages, the amount of calcium present is from about 0.15 to about 1.30% by weight. Typically, drinkable beverages are prepared from 3-fold (3X) to 5-fold (5X) juice concentrates. Accordingly, the level of calcium is preferably in the range of from about 0.3 to about 0.75% by weight for these concentrates when they are used to prepare beverages having from about 0.10 to about 0.15% by weight solubilized calcium.

A key component in the fruit juice beverages and juice concentrates of the present invention from the standpoint of solubilizing the calcium and providing desirable taste properties is the acid component. This acid component comprises a mixture of citric acid and malic acid. These acids can be present in their undisassociated form, but are typically present as the respective citrate and malate species. If desired, other edible acids such as phosphoric acid, fumaric acid, and the like can also be included in the fruit juice beverages and juice concentrates of the present invention. Preferably, the acid component consists essentially of a mixture of citric and malic acids.

The level at which the acid component (hereafter total acids) is present depends on the fruit juice product involved, the level of calcium included, as well as the taste properties desired. (For the purposes of the present invention, "total acids" include those naturally present, plus any acids added.) For fruit juice beverages having from about 0.05 to about 0.26% by weight solubilized calcium, the level of total acids can range from about 0.4 to about 4% by weight. (For juice concentrates used to prepare such beverages, the level of total acids can range from about 1.2 to about 20% by weight). For beverages having from about 0.10 to about 0.15% by weight solubilized calcium, the level of total acids preferably ranges from about 0.8 to about 1.8% by weight. (For juice concentrates used to prepare such beverages, the level of total acids preferably ranges from about 2.4 to about 9% by weight.)

The weight ratios of citric acid to malic acid in the acid component can vary, especially depending upon the flavor and sourness effects desired, and the fruit juice used. Generally, the weight ratio of citric acid to malic acid can be from about 5:95 to about 90:10 over the entire range of fruit juices. For citrus juice products such as orange juice, this weight ratio is typically from about 20:80 to about 90:10, preferably from about 60:40 to about 90:10. For noncitrus juices such as apple juice, this weight ratio is typically from about 5:95 to about 80:20, preferably from about 30:70 to about 50:50.

The fruit juice beverages and juice concentrates of the present invention also contain the sugars normally present in fruit juice products. These sugars include sucrose, fructose, high fructose corn syrup, glucose, invert sugar, and mixtures thereof. The amount of sugar naturally present in fruit juices is usually sufficient for the calcium-supplemented fruit juice beverages and juice concentrates of the present invention. However, in the case of extended juice products, sugar is typically added, usually in the form of sucrose or high fructose corn syrup.

In addition to sugar, extended fruit juice beverages of the present invention can contain other sweeteners. Other suitable sweeteners include saccharin, cyclamates, acetosulfam, L-aspartyl-L-phenylalanine lower alkyl ester sweeteners (e.g. aspartame), L-aspartyl-D-alanine amidos disclosed in U.S. Pat. No. 4,411,925 to Brennan et al., issued Oct. 23, 1983 (herein incorporated by reference), L-aspartyl-D-serine amides disclosed in U.S. Pat. No. 4,399,163 to Brennan et al., issued Aug. 16, 1983 (herein incorporated by reference), L-aspartyl-L-l-hydroxymethylalkancamide sweeteners disclosed in U.S. Pat. No. 4,338,346 to Brand, issued Dec. 21, 1982 (herein incorporated by reference), L-aspartyl-1-hydroxyethylalkaneamide sweeteners disclosed in U.S. Pat. No. 4,423,029 to Rizzi, issued Dec. 27, 1983 (herein incorporated by reference), L-aspartyl-D-phenylglycine ester and amide sweeteners disclosed in European Patent Application No. 168,112 to J. M. Jahusz, published Jan. 15, 1986 (herein incorporated by reference), and the like. A particularly preferred sweetener for use in such extended juice products is aspartame.

For single-strength fruit juice beverages, the sugar content can range from about 2° to about 16° Brix. Typically, the sugar content of such beverages depends upon the amount of fruit juice contained therein. For full-strength beverages containing at least about 95% fruit juice, the sugar content is typically from about 5° to about 14° Brix. For extended juice beverages which comprise from about 50 to about 90% fruit juice, the sugar content is typically from about 5° to about 13° Brix (no other sweetener) or from about 2° to about 8° Brix (other sweetener containing).

For fruit juice concentrates according to the present invention, the sugar content can range from about 6° to about 75° Brix. Typically, the sugar content of these juice concentrates is from about 20° to about 50° Brix. For orange juice concentrates, the sugar content is preferably from about 35° to about 50° Brix.

The fruit juice beverages and juice concentrates of the present invention are substantially free of added protein. Examples of such proteins include soy protein, whey protein concentrate, and the like. These proteins can react with fruit juice aromas and flavors and, if hydrolyzed, can form short-chain peptides or amino acids which have undesirable bitter flavors. For fruit juice beverages of the present invention, the amount of added protein is generally no more than about 0.1% by weight. Preferably, these beverages and concentrates contain no added protein.

The fruit juice beverages and juice concentrates of the present invention also contain minimized levels of chloride ion. Inclusion of too high a level of chloride ion can cause undesirable brackishness in a fruit juice beverage. High levels of chloride ion have also been found to reduce the flavor and sweetness intensity of orange juice. The level of chloride ion is generally no more than about 0.07% by weight of the fruit juice beverage, and is preferably such that undesirable brackishness cannot be detected, i.e. no more than about 0.03% by weight. (Fruit juice concentrates of the present invention are formulated such that they provide, when diluted with the appropriate amount of water, drinkable beverages which have the specified maximum level of chloride ion.)

Calcium-supplemented fruit juice products of the present invention can also comprise low levels of soluble phosphate. Addition of soluble phosphate, in particular phosphoric acid, at up to 0.04% by weight has been found to improve the upfront acidity of calcium-supplemented apple juice beverages. However, this benefit does not occur when the soluble phosphate is added at much above about 0.04% by weight.

Other optional ingredients typically present fruit juice products can be included in the beverages and concentrates of the present invention. For example, preservatives, vitamins and other minerals can be included. Suitable vitamins include A, D, E, C (ascorbic acid), $B_1$, $B_2$, $B_6$, $B_{12}$, niacin, folic acid, thiamine, biotin and riboflavin. Other minerals besides calcium which can be included are iron, zinc, potassium, magnesium, manganese and copper. If desired, natural and synthetic flavorings and colorings can be included in these beverages and concentrates.

A suprising property of the calcium-supplemented fruit juice products of the present invention is the excellent absorbability/bioavailability of calcium therefrom, even compared to milk. This observation is based on data obtained in experiments where the whole body retention of radiolabeled calcium ($^{47}$Ca) from calcium-supplemented orange juice, calcium-supplemented apple juice, and goats' milk dosed to rats was measured. (Measurements of whole body retention of radiolabled calcium are believed to accurately reflect combined absorbability and bioavailability of the calcium). Each of the beverages dosed contained 0.12% by weight calcium. Calcium retention for the goats' milk was about 26 (intrinsically labelled $^{47}$Ca) to about 31% (extrinsically labelled $^{47}$Ca) based on the total amount of calcium in the milk. By comparison, calcium retention for the supplemented orange juice and apple juice products was 54% and 47%, respectively, based on the total amount of calcium in the juice.

D. Method for Preparing Calcium Supplemented Fruit Juice Products.

The calcium-supplemented fruit juice products of the present invention are prepared by a unique method. This method is shown schematically in the FIGURE. The following discussion of this method will generally be with regard to formation of orange juice beverages and juice concentrates, which are highly preferred fruit juice products according to the present invention. However, this method can also be used to prepare calcium-supplemented fruit juice products based on other citrus juices such as grapefruit juice, noncitrus juices such as apple juice, as well as mixtures of juices.

Referring to the FIGURE, an acid component comprising citric acid and malic acid (Acids) is typically dissolved in the appropriate quantity of water. (If desired, fruit juice or concentrated fruit juice such as lemon juice can be used to supply a portion of the acids). Generally, this acid component comprises from 0 to about 90% by weight citric acid and from about 10 to 100% by weight malic acid. For orange juice, this acid component typically comprises from about 20 to about 90% by weight citric acid and from about 10 to about 80% by weight malic acid. Preferably, this acid component comprises from about 15 to about 60% by weight citric acid and from about 40 to about 85% by weight malic acid. (For noncitrus juices such as apple juice, this acid component typically comprises from about 5 to about 80% by weight citric acid and from about 20 to about 95% by weight malic acid, and preferably comprises from about 20 to about 50% by weight citric acid and from about 50 to about 80% by weight malic acid.) As a rule, the ratio of these acids is selected to provide optimum flavor character in the juice.

Once the solution containing the dissolved acids is formed, a source of calcium is then added. Calcium carbonate ($CaCO_3$) is a preferred calcium source. This calcium source leads to the greatest and most rapid initial solubilization of calcium and causes the least amount of off-flavor generation. Calcium hydroxide [$Ca(OH)_2$] and calcium oxide (CaO) are also acceptable calcium sources, but can cause more off-flavor generation than calcium carbonate. The weight ratio of total acids to calcium added in the solution is typically from about 0.5 to about 12. Preferably, this weight ratio is from about 1 to about 6.

Addition of calcium carbonate, calcium oxide, or calcium hydroxide to the aqueous solution of acids provides a premix containing an at least meta-stable solution of solubilized calcium. This is due to the fact that highly soluble calcium citrate and malate species such as CaHcitrate, Ca($H_2$ citrate)$_2$, and CaHmalate are formed in the solution due to the reaction between the calcium source and the acids. Without added stabilizers, the highly soluble calcium citrate species are stable in the premix solution for periods up to only about a few hours. After this short period of time, the highly soluble citrate species tend to disproportionate to the corresponding acid and the more thermodynamically stable, insoluble calcium citrate salts, such as $Ca_3$ citrate$_2$.

To improve the stability of the more soluble calcium malate and especially citrate species in the premix solution, it is preferred in the method of the present invention to include a premix stabilizer. Materials which can complex with calcium and/or act as crystallization inhibitors are useful as premix stabilizers. These materials include sugars, such as sucrose, glucose, fructose, high fructose corn syrup, invert sugar, and polysaccharides such as pectin, algins, hydrolyzed starches, xanthan gum, and other edible gums. Concentrated juices which naturally contain both sugars and polysaccharides are particularly suitable premix stabilizers. Preferred premix stabilizers are sucrose and high fructose corn syrup (especially for extended juice products) and concentrated orange juice having a sugar content of from about 35° to about 80° Brix whose source is described hereafter.

The premix stabilizer can be added immediately after the calcium source is added to the aqueous solution containing the acids. (When calcium carbonate is the calcium source, carbon dioxide evolution is preferably allowed to substantially cease before the premix stabilizer is added). However, if desired, the premix stabilizer (especially in the case of sugars and concentrated juice) can be added to the aqueous solution of the acids prior to addition of the calcium source. The amount of premix stabilizer included in the premix solution typically depends upon the stabilizer used. When sugars are used as the premix stabilizer, they are typically added in an amount sufficient to provide a sugar content of from about 2° to about 40° Brix. When polysaccharides are used, the amount can vary widely, but is typically from about 0.01 to about 0.5% on a weight/volume basis. When concentrated juice is used as the premix stabilizer, it is typically included in an amount sufficient to provide a sugar content of from about 2° to about 12° Brix (preferably from about 2° to about 6° Brix).

The premix solution of solubilized calcium is typically prepared in a batch-type fashion, as in the description above, at room temperature. However, this premix solution can also be prepared in a continuous fashion. In this continuous method, the ingredients (water, acids, calcium source and optional premix stabilizer) are constantly metered together to form the premix solution. The level at which the ingredients are metered is adjusted, as necessary, to insure appropriate solubilization of the calcium in the premix solution and to provide the appropriate acidity.

The premix solution containing the solubilized calcium is combined in a mix tank with chilled (e.g., below about 40° F. (4.4° C.)) concentrated orange juice (Conc. Juice) having a sugar content of from about 35° to about 80° Brix (preferably from about 60° to about 70° Brix.), orange juice aroma and flavor volatiles (Aroma/Flavor Concentrate), plus other orange juice materials such as pulp and peel oils, to provide calcium-supplemented orange juice products having: (1) at least about 0.05% solubilized calcium; (2) at least about 45% orange juice; and (3) a sugar content of from about 2° to about 75° Brix. The particular proportions of premix solution, concentrated juice, aroma and flavor volatiles, pulp and peel oils used will depend upon a number of different factors, including the degree of calcium supplementation desired and the type of orange juice product involved (single-strength juice beverage or juice concentrate). For example, calcium-supplemented (0.56% calcium) 42° Brix orange juice concentrates can be prepared by combining 65 parts concentrated orange juice (65° Brix), 5 parts pulp, 15 parts of an aroma/flavor concentrate, 0.4 parts peel oil and 14.6 parts of a premix solution obtained by combining 1.4 parts calcium carbonate, 2.2 parts of a mixture of citric and malic acid, 10 parts water and 1 part concentrated orange juice (42° Brix). Similar single-strength juice beverages can be prepared by appropriate variation of the amounts of concentrated orange juice, pulp, aroma/flavor concentrate, peel oil and premix solution, as well as the inclusion of water. After the calcium-supplemented orange juice product is obtained, it is then filled into cans, cartons, bottles or other appropriate packaging. In the case of calcium-supplemented orange juice concentrates, these products are typically frozen after being filled into cans.

The concentrated orange juice, orange juice aroma and flavor volatiles, pulp and peel oils used in the method of the present invention can be obtained from standard orange juice processing. See Nagy et al., *Citrus Science and Technology,* Volume 2, (AVI Publishing Co. 1977), pp 177–252 (herein incorporated by reference) for standard processing of oranges, grapefruit and tangerines. (See also Nelson et al, *Fruit & Vegetable Juice Processing Technology* (3rd Ed., AVI Publishing 1980), pp. 180–505 (herein incorporated by reference) for standard processing of noncitrus juices such as apple juice, grape juice, pineapple juice, etc. to provide sources of juice and juice materials for calcium-supplemented noncitrus juice products.) Fresh juice is extracted from the oranges, principally of the Valencia type. (The peel of the oranges is initially rasped to provide peel oils which can be used in the method of the present invention). Juices from different oranges are frequently blended to adjust the sugar to acid ratio. A sugar to acid ratio of from about 8:1 to about 20:1 is considered acceptable. However, preferred sugar to acid ratios are typically from about 11:1 to about 15:1.

Juice is extracted from the oranges by using automatic juicing machines, or less often by hand squeezing of the oranges. The type of equipment used to extract the juice is not critical. The raw juice exiting from the squeezing device contains pulp, rag and seeds. The rag and seed are separated from the juice and pulp in a finisher. The juice is then typically separated into a pulp portion and a serum portion. (The pulp portion can be used as a source of pulp in the method of the present invention).

The serum portion can be concentrated by a variety of techniques which typically include evaporative concentration or freeze concentration. In evaporative concentration, the serum portion of the juice is passed through an evaporator (e.g. falling film or temperature accelerated short time evaporator (TASTE) type). Water vapor, as well as the aroma and flavor volatiles, are stripped from the juice. These stripped volatiles are then centrifuged to provide an upper layer (essence oils) and a lower layer (aqueous essence). (A portion of these essence oils and aqueous essence are typically used as the source of orange juice aroma and flavor volatiles for the method of the present invention). The remaining stripped juice is then concentrated in the evaporator (by heat) to the appropriate amount of solids as measured by the sugar content of the concentrated juice. This concentrated juice can then be used in the method of present invention.

Most concentrated orange juices are obtained by evaporative concentration. However, freeze concentration can also be used to obtain concentrated orange juice useful in the method of the present invention. Freeze concentration typically involves passing the serum portion of the juice through a scraped wall heat exchanger to form substantially pure ice crystals which are then separated from the concentrated juice. A preferred freeze concentration method is disclosed in U.S. Pat. 4,374,865 to Strobel, issued Feb. 22, 1983, which is incorporated by reference. Unlike evaporative concentration, concentrated orange juice obtained by freeze concentration typically contains the aroma and flavor volatiles as well.

Calcium-supplemented fruit juice beverages and juice concentrates of the present invention can be prepared by other methods. For example, the acids and calcium carbonate can be directly added to a concentrated fruit juice stripped of aroma and flavor volatiles. This method requires that the acids and calcium carbonate be mixed well to insure solubilization of the calcium. This can cause undesirable foaming and loss of volatile flavor compounds in the juice unless done carefully. Care also has to be taken in this method to avoid the generation of cooked/browed off-flavors due to the reaction and/or interactions of flavor components in the local basic environment surrounding the dissolved calcium carbonate or calcium hydroxide. Further, when calcium carbonate (alone or with citric acid) is directly added to the juice, there is residual carbonation. This residual carbonation has been found to impart an unpleasant spoiled fermented note, especially in orange juice. For these reasons, the use of the premix solution of solubilized calcium is the preferred method for preparing calcium-supplemented fruit juice beverages and juice concentrates of the present invention.

SPECIFIC ILLUSTRATIONS OF METHODS FOR PREPARING CALCIUM-SUPPLEMENTED FRUIT JUICE CONCENTRATES

The following illustrate the preparation of calcium-supplemented fruit juice concentrates according to the present invention:

A. Orange Nectar Concentrate

A calcium-supplemented orange nectar concentrate was prepared from the following ingredients:

| Ingredient | Amount (g.) |
| --- | --- |
| 65° Brix Orange Juice Concentrate | 2070 |
| Aqueous Orange Essences | 550 |
| Orange Pulp | 270 |
| Orange Oils | 2 |
| Orange Flavor Mix | 14 |
| Calcium Carbonate | 58 |
| Citric Acid | 68 |
| Malic Acid | 54 |
| Sucrose | 910 |
| Water | 1450 |
| Total | 5446 |

The premix solution was prepared by dissolving the sugar and then the acids (citric and malic) in the water. Calcium carbonate was added and the mixture agitated until foaming ceased. This premix solution had a total acids to calcium weight ratio of 5.3 and a citric acid:malic acid weight ratio of 56:44. The premix solution was added, with stirring, to the 65° Brix orange juice concentrate, followed by the orange essences, orange pulp, orange oil, and orange flavor mix. The resulting calcium-supplemented orange concentrate nectar had a sugar content of 42° Brix, 0.44% by weight calcium, a total acids to calcium weight ratio of 10, and a citric acid:malic acid weight ratio of 67:33. One part of this orange nectar concentrate, when diluted with three parts water, provides an orange nectar beverage containing 60% orange juice and 0.11% by weight calcium.

B. Orange Juice Concentrate

A calcium-supplemented orange juice concentrate was prepared from the following ingredients:

| Ingredient | Amount (g.) |
| --- | --- |
| 65° Brix Orange Juice Concentrate | 3472 |
| Aqueous Orange Essences | 549 |
| Orange Pulp | 273 |
| Orange Oils | 9 |
| Calcium Carbonate | 62 |
| Citric Acid | 11 |
| Malic Acid | 44 |
| Water | 1040 |
| Total | 5460 |

The premix solution was prepared by dissolving the acids in the water and then adding the calcium carbonate. To this mixture was immediately added portions of the 65° Brix orange juice concentrate up to about a third of the total to be used. This premix solution had a total acids to calcium weight ratio of 2.2 and a citric acid:malic acid weight ratio of 20:80. The premix solution was added to the remaining 65° Brix orange juice concentrate, followed by the aqueous orange essences, orange pulp and orange oils. The resulting calcium-supplemented orange juice concentrate had a sugar content of 45° Brix, 0.4% by weight calcium, a total acids to calcium weight ratio of 11 and a citric acid:malic acid weight ratio of 67:33. One part of this orange juice concentrate, when diluted with three parts water, provides an orange juice beverage containing 98% orange juice and 0.1% by weight calcium.

C. Apple Juice Beverage

Embodiment 1

A calcium-supplemented apple juice beverage was prepared from the following ingredients:

| Ingredient | Amount (g.) |
| --- | --- |
| 70° Brix Apple Juice Concentrate | 243.22 |
| Apple Aroma Concentrate | 212.85 |
| Calcium Carbonate | 4.26 |
| Citric Acid | 1.06 |
| Malic Acid | 2.98 |
| Water | 954.63 |
| Total | 1419.0 |

The premix solution was prepared by dissolving the acids in 400 g. of the water and then carefully adding the calcium carbonate with stirring. After foaming ceased (about 5 min.), the premix solution was added to the 70° Brix apple juice concentrate, followed by the apple aroma concentrate and the remaining 554.63 g. of water. The mixture was stirred vigorously and then bottled to provide a calcium-supplemented apple juice beverage containing 0.12% by weight calcium.

Embodiment 2

A calcium-supplemented apple juice beverage was prepared from the following ingredients:

| Ingredient | Amount (g.) |
| --- | --- |
| 70° Brix Apple Juice Concentrate | 243.22 |
| Apple Aroma Concentrate | 212.85 |
| Sucrose | 14.19 |

| Ingredient | Amount (g.) |
|---|---|
| Calcium Carbonate | 4.26 |
| Citric Acid | 1.42 |
| Malic Acid | 3.97 |
| Water | 939.09 |
| Total | 1419.0 |

The calcium-supplemented apple juice beverage was prepared according to the procedure of Embodiment 1, except that the sucrose (as a premix stabilizer) was added during preparation of the premix solution.

What is claimed is:

1. A calcium-supplemented single-strength fruit juice beverage, which is substantially free of added protein and which comprises:
   a. from about 0.06 to about 0.26% by weight solubilized calcium;
   b. from about 0.4 to about 4% by weight of an acid component comprising a mixture of citric acid and malic acid in a weight ratio of citric acid: malic acid of from about 5:95 to about 90:10;
   c. at least about 45% fruit juice;
   d. a sugar content from about 2° to about 16° Brix; and
   e. no more than about 0.07% by weight chloride ion.

2. The beverage of claim 1 wherein said fruit juice is citrus juice.

3. The beverage of claim 2 wherein said fruit juice is orange juice and wherein said weight ratio of citric acid:malic acid is from about 60:40 to about 90:10.

4. The beverage of claim 3 wherein said orange juice comprises from about 50 to about 90% of the beverage.

5. The beverage of claim 4 wherein said orange juice comprises from about 50 to about 70% of the beverage.

6. The beverage of claim 5 which further comprises aspartame and wherein said sugar content is from about 2° to about 8° Brix.

7. The beverage of claim 3 wherein said orange juice comprises at least about 95% of the beverage.

8. The beverage of claim 3 wherein said solubilized calcium comprises from about 0.10 to about 0.15% by weight of the beverage and wherein said acid component comprises from about 0.8 to about 1.8% by weight of the beverage.

9. The beverage of claim 2 wherein said citrus juice is grapefruit juice.

10. The beverage of claim 1 wherein said fruit juice is apple juice and wherein said weight ratio of citric acid:malic acid is from about 30:70 to about 50:50.

11. The beverage of claim 1 which comprises no more than about 0.03% by weight chloride ion.

12. A calcium-supplemented fruit juice concentrate, which is substantially free of added protein and which comprises:
   a. from about 0.15 to about 1.30% by weight solubilized calcium;
   b. from about 1.2 to about 20% by weight of an acid component comprising a mixture of citric acid and malic acid in a weight ratio of citric acid:malic acid of from about 5:95 to about 90:10;
   c. at least about 45% fruit juice; and
   d. a sugar content from about 6° to about 75° Brix.

13. The concentrate of claim 12 wherein said fruit juice is citrus juice.

14. The concentrate of claim 13 wherein said citrus juice is orange juice and wherein said weight ratio of citric acid:malic acid is from about 60:40 to about 90:10.

15. The concentrate of claim 14 which has been frozen.

16. The concentrate of claim 15 wherein said solubilized calcium comprises from about 0.3 to about 0.75% by weight of the concentrate and wherein said acid component comprises from about 2.4 to about 9% by weight of the concentrate.

17. The concentrate of claim 16 wherein said orange juice comprises at least about 95% of the concentrate.

18. The concentrate of claim 15, wherein said orange juice comprises from about 50 to about 90% of the concentrate.

* * * * *

UNITED STATES PATENT AND TRADEMARK OFFICE
CERTIFICATE OF CORRECTION

PATENT NO.   :   4,722,847
DATED        :   February 2, 1988
INVENTOR(S)  :   David C. Heckert It is certified that error appears in the above-identified patent and that said Letters Patent is hereby corrected as shown below:

Column 13, line 8, "0.06," should read -- 0.05--.

Signed and Sealed this

Eighth Day of May, 2001

*Attest:*

NICHOLAS P. GODICI

*Attesting Officer*   Acting Director of the United States Patent and Trademark Office